(12) United States Patent
Midmore (10) Patent No.: US 9,576,244 B2
(45) Date of Patent: *Feb. 21, 2017

(54) METHODS AND SYSTEMS OF FOUR-VALUED SIMULATION

(71) Applicant: Roger Midmore, San Francisco, CA (US)

(72) Inventor: Roger Midmore, San Francisco, CA (US)

( * ) Notice: Subject to any disclaimer, the term of this patent is extended or adjusted under 35 U.S.C. 154(b) by 310 days.

This patent is subject to a terminal disclaimer.

(21) Appl. No.: 14/016,518

(22) Filed: Sep. 3, 2013

(65) Prior Publication Data

US 2015/0066836 A1    Mar. 5, 2015

(51) Int. Cl.
*G06N 7/00* (2006.01)
*G06N 5/04* (2006.01)
*G06N 5/02* (2006.01)

(52) U.S. Cl.
CPC . *G06N 5/04* (2013.01); *G06N 5/02* (2013.01)

(58) Field of Classification Search
None
See application file for complete search history.

(56) References Cited

U.S. PATENT DOCUMENTS

| | | | | |
|---|---|---|---|---|
| 7,634,398 | B2* | 12/2009 | Knoll et al. | 704/9 |
| 2007/0074152 | A1* | 3/2007 | Roe | 717/104 |
| 2009/0171876 | A1* | 7/2009 | Tirri | 706/46 |
| 2011/0093465 | A1* | 4/2011 | Sporer et al. | 707/737 |

OTHER PUBLICATIONS

"Algorithms for Paraconsistent Reasoning with OWL", Yue Ma, Pascal Hitzler, Zuoquan Lin, The Semantic Web: Research and Applications, Lecture Notes in Computer Science, vol. 4519, 2007, pp. 399-413.*
"High Performance Natural Language Processing on Semantic Network Array Processor", Hiroaki Kitano, Dan Moldovan, Seungho Cha, IJCAI, vol. 12, No. 1991, pp. 911-917, 1991.*
"An Overview of Rewrite Rule Laboratory (RRL)", Deepak Kapur, Hantao Zhang, Rewriting Techniques and Applications, Lecture Notes in Computer Science, vol. 355, 1989, pp. 559-563.*

(Continued)

*Primary Examiner* — Stanley K Hill
*Assistant Examiner* — Mai T Tran
(74) *Attorney, Agent, or Firm* — West & Associates, A PC; Stuart West; Shaun Sluman (57) ABSTRACT

A system for the dynamic encoding in a semantic network of both syntactic and semantic information into a common four valued logical notation. The encoding of new information being benign to prior syntactic constructions, tests for N conditionals in time O(C) and allows for the proper quantification of variables at each recursive step. The query/inference engine constructed from such an implementation is able to optimize short term memory for maximizing long term storage in the automaton. In a parallel context this can be viewed as optimizing communication and memory allocation between processes. Disclosed embodiments of a four valued encoding achieve efficiencies in minimizing the run time stack and maximizing heap size especially in a parallel architecture. Disclosed embodiments are useful in simulation and search engine implementations.

12 Claims, 5 Drawing Sheets

Diagram of the arrays (with size = N) associated with each Semantic Node (56) References Cited

OTHER PUBLICATIONS

"Four-valued Logic", Katalin Bimbo, J. Michael Dunn, Notre Dame J. Formal Logic, vol. 42, No. 3, 2001, pp. 171-192.*
"Semantic Network Array Processor as a Masssively Paralllel Computing Platform for High Performance and Large-Scale Natural Language Processing", H. Kitano, D. Moldovan, Coling 1992 Proceedings of the 14th conference on Computational Linguistics, vol. 2, pp. 813-819.*
Klein, S., John Aeschlimann, Matthew Appelbaum, David Balsiger, Elizabeth Curtis, Mark Foster, David Kalish, Ying-Da Lee and Lynee Price. (1976) "Simulation D'Hypotheses Emises Par Propp & Levi-Strauss en Utilisant un Systeme de Simulation Meta-Symbolique". Informatique et Sciences Humaines. N. Mar. 28.
Kleene S."Representation of Events in Nerve Nets and Finite Automata". Rand Memorandum RM-704. USA. Dec. 1951.
Kleene S. Introduction to Metamathematics. North Holland. USA. 1952. pp. 207, 317-337, 382, 536.
Kleene S. and Richard Vesley. The Foundations of Intuitionistic Mathematics Especially in Relation to Recursive Functions. North-Holland. USA. 1965. pp. 133-163.
Kleene S. Mathematical Logic. John Wiley. New York. 1967. pp. 176, 240-241.
Kleene S."Realizability: A Retrospective Survey". Cambridge Summer School in Mathematical Logic. Edited by Mathias, R. and H. Rogers. p. 95-112. 1973. p. 104.
Kleene S. "The Theory of Recursive Functions, Approaching Its Centennial". Bulletin of the American Mathematical Society. vol. 5, No. 1. USA. Jul. 1981. pp. 57-61.
Klein S. and Robert Simmons. "A Computational Approach to the Grammatical Encoding of English Words". Journal for the Association for Computing Machinery. vol. 10 N. 3. USA.
Klein S. and Robert Simmons. "Syntactic Dependence and the Computer Generation of Coherent Discourse". Mechanical Translation, vol. 7 No. 2. USA. Aug. 1963.
Klein S. "Automatic Paraphrasing in Essay Format". Mechanical Translation, vol. 8 N. 3&4. USA. Aug.-Dec. 1965.
Klein S. "Control of Style With a Generative Grammar". Language 41: 619-631. USA. 1965.
Klein S. "Historical Change in Language Using Monte Carlo Techniques". Mechanical Translation. 9: 619-631. USA. 1966.
Klein S., Stephen Lieman and Gary Lindstrom. "Diseminer: A Distributional Semantics Inference Maker". Carnegie Mellon University Tech Report #1719, USA. 1966.
Klein S. "Current Research in the Computer Simulation of Historical Change in Language". University of Wisconsin Tech Report #6. USA. Aug. 1967.
Klein S., W. Febens, R. Herriott, W. Katke, M. Kupping & A. Towster. "The Autoling System". University of Wisconsin Tech Report #43. USA. Sep. 1968.
Klein S., M. Kuppins and K. Meives. "Monte Carlo Simulation of Language Change in Tikopia and Maori". University of Wisconsin Tech Report #62. USA. Jun. 1969.
Klein S. and Michael Kuppin. "An Interactive, Heuristic Program for Learning Transformational Grammars". University of Wisconsin Tech Report #97. USA. Aug. 1970.
Klein S. and T. Dennison. "An Interactive Program for Learning the Morphology of Natural Languages". University of Wisconsin Tech Report #144. USA. Dec. 1971.
Klein S. "Automatic Inference of Semantic Deep Structure Rules in Generative Semantic Grammars." University of Wisconsin Tech Report #180. USA. May 1973.
Klein S. and V. Rozencevj. "A Computer Model for the Ontogeny of Pidgin and Creole Languages". University of Wisconsin Tech Report #238. USA. Dec. 1974.
Klein S. "Computer Simulation of Language Contact Models". Toward Tomorrow's Linguistics. Edited by R. Shuy & C. J. Bailey. Georgetown University Press. USA. 1974.
Klein S. "Meta-Compiling Text Grammars as a Model for Human Behavior". University of Wsconsin Tech Report #252. USA. Apr. 1975.
Klein S., D. Kaufer and C. Neuwirth. "The Locus of Metaphor in Frame Driven Text Grammar". University of Wisconsin Tech Report #366. USA. Sep. 1979.
Klein S. "Culture, Mysticism and Social Structure and the Calculation of Behavior". University of Wisconsin Technical Report #462. USA. 1981.
Klein S. "Analogy, Mysticism and the Structure of Culture". Current Anthropology. vol. 24 No. 2. USA. Apr. 1983. pp. 156-162.
Klein S. "The Invention of Computationally Plausible Knowledge Systems in the Upper Paleolithic". University of Wisconsin Tech Report #628. USA. Dec. 1985.
Lukasiewicz J. Aristotle's Syllogistic From the Standpoint of Modern Formal Logic. Oxford University Press. England. 1955. 2nd edition. pp. 158-173.
Siemens D. "On Klein's 'Analogy, Mysticism and the Structure of Culture'". Current Anthropology, vol. 29 No. 3. USA. Jun. 1988. pp. 472-478.
Steedman M. "Categorial Grammar". University of Pennsylvania Department of Computer and Information Science Technical Report No. MS-CIS-92-52. USA. 1992.
Troelstra A.S."From Constructivism to Computer Science". Theoretical Computer Science, No. 211, 1999. pp. 236-239.
Turing A. "Lecture to the London Mathematical Society on Feb. 20, 1947". Unpublished Manuscript. Alan Turing: His work and Impact. Edited by S. Cooper and Jan Leeuwen. Else.
Turing A. "Solvable and Unsolvable Problems". Alan Turing: His work and Impact. Edited by S. Cooper and Jan Leeuwen. Elsevier Science. United Kingdom. 2012. p. 331.
Yngve V. From Grammar to Science: New Foundations for General Linguistics. John Benjamins Publishing. Amsterdam. 1996. pp. 47-63.
Belnap N., H. Leblanc & R. Thomason. "On Not Strengthening Intuitionistic Logic". Notre Dame Journal of Formal Logic, vol. 4 No. 4. USA. Oct. 1963.
Chretien D. "Review of the Calculus of Linguistic Observations". Language, vol. 4 No. 2. USA. 1965.
Midmore R. "An Interpretation of Sheldon Klein's Four Valued Analogical Transformational Operator". University of Wisconsin Technical Report #1801. USA. Feb. 2014.
Norvig P. and S. Russell. Artificial Intelligence: A Modern Approach. Pearson Education Inc. New Jersey, 2003. pp. 7-8.
Shapiro S. and R. Bechtel. "A Logic for Semantic Networks". University of Indiana Technical Report #47. USA. Mar. 1976.
Reichenbach H. The Theory of Probability. University of California Press. Berkeley and Los Angeles. USA. 1949. pp. xi, 387-401.
Lamport L. "Time, Clocks and the Ordering of Events in a Distributed System". Communications of the ACM. vol. 21 No. 7. USA. 1978.
Englemore, R. and Tony Morgan. Blackboard Systems.. Addisson Wesley Publishers. New York. 1988. pp. 475-490.
Halton, J. "A Retrospective and Prospective Survey of the Monte Carlo Method". University of Wisconsin Computer Science Tech Report #13. Feb. 1968.
Hays D., Bozena Henisz-Dostert and Marjorie Rapp (editor). "Annotated Bibliography of Rand Publications in Computational Linguistics". Rand Memorandum RM-3894-3. 1965. pp. 1.
Hays D., Marjorie Rapp, Boana Henisz-Dostert & Jean Houston (editors). "Bibliography of Computational Linguitics 1964". Rand Memorandum RM-4523-PR Mar. 1965. pp. 1-5.
Hays ., Marjorie Rapp, Boana Henisz-Dostert & Jean Houston (editors). "Bibliography of Computational Linguistics 1965". Rand Memorandum 4986-PR. Apr. 1966. pp. 1-5.
Hays D., M, Boana Henisz-Dostert & Jean Houston (editors). "Bibliography of Computational Linguistics 1966". Rand Memorandum RM-5345-PR. Apr. 1967. pp. 1-5.
Hays D., Boana Henisz-Dostert & Jean Houston (editors). "Bibliography of Computational Linguistics 1967". Rand Memorandum RM-5733-PR. Jul. 1968. pp. 1-5.

(56) References Cited

OTHER PUBLICATIONS

Hays D, Boana Henisz-Dostert, Jean Houston & Dolores Lofgren (editors). "Bibliography of Computational Linguistics 1968". Rand Memorandum RM-6233-PR. Jan. 1970. pp. 1-5.
Herdan G. The Advanced Theory of Language as Choice or Chance. Spring-Verlag. The Hague 1966. pp. 438-445.
Englemore, R. and Tony Morgan, (1988). Blackboard Systems. New York. Addisson Wesley Publishers.
Halton, J., (1968). "A Retrospective and Prospective Survey of The Monte Carlo Method". University of Wisconin Computer Science Tech Report #13. Feb. 1968.
Hays, David, Bozena Henisz-Dostert and Marjorie Rapp (editor). (1965) "Annotated Bibliography of Rand Publications in Computational Linguistics". Rand Memorandum RM-3894-3.
Hays, David. Marjorie Rapp and Boana Henisz-Dostert & Jean Houston (editors). (1965) "Bibliography of Computational Linguitics 1964". Rand Memorandum RM-4523-PR March.
Hays, David. Marjorie Rapp and Boana Henisz-Dostert & Jean Houston (editors). (1966) "Bibliography of Computational Linguistics 1965". Rand Memorandum 4986-PR. April.
Hays, David. Marjorie Rapp, Boana Henisz-Dostert & Jean Houston (editors). (1967) "Bibliography of Computational Linguistics 1966". Rand Memorandum RM-5345-PR. April.
Hays, David. Boana Henisz-Dostert & Jean Houston (editors). (1968). "Bibliography of Computational Linguistics 1967". Rand Memorandum RM-5733-PR. July.
Hays,D, Henisz-Dostert, Bozena. Jean Houston & Dolores Lofgren (editors). (1970). "Bibliography of Computational Linguistics 1968". Rand Memorandum RM-6233-PR. January.
Herdan, G. (1966). The Advanced Theory of Language as Choice or Chance. Spring-Verlag.
Kleene, S., (1951) "Representation of Events in Nerve Nets and Finite Automata". Rand Memorandum RM-704. December.
Kleene, S. , (1952). Introduction to Metamathematics. North Holland.
Kleene, S. and Richard Vesley, (1965). The Foundations of Intuitionistic Mathematics Especially in Relation to Recursive Functions. North-Holland.
Kleene, S., (1967). Mathematical Logic. John Wiley. New York.
Kleene, S., (1973)."Realizability: A Retrospective Survey". Cambridge Summer School in Mathematical Logic. Edited by Mathias, R. and H. Rogers. p. 95-112.
Kleene,S., (1981). "The Theory of Recursive Functions, Approaching Its Centennial". Bulletin of the American Mathematical Society. vol. 5, No. 1, Jul. 1981.
Klein, S. and Robert Simmons, (1963). "A Computational Approach to the Grammatical Encoding of English Words". Journal for the Association for Computing Machinery. vol. 10 N. 3 July.
Klein, S. and Robert Simmons. (1963). "Syntactic Dependence and the Computer Generation of Coherent Discourse". Mechanical Translation, vol. 7 No. 2, August.
Klein, S. (1965). "Automatic Paraphrasing in Essay Format". Mechanical Translation, vol. 8 N. 3&4, Aug.-Dec. 1965.
Klein, S. (1965). "Control of Style With a Generative Grammar". Lanugage 41: 619-631.
Klein, S. (1966). "Historical Change in Language Using Monte Carlo Techniques". Mechanical Translation. 9: 619-631.
Klein, S., Stephen Lieman and Gary Lindstrom, (1966). "DISEMINER: A Distributional Semantics Inference Maker". Carnegie Mellon University Tech Report #1719.
Klein, S. (1967). "Current Research in the Computer Simulation of Historical Change in Language". University of Wisconsin Tech Report #6. Aug. 1967.
Klein, S. W. Febens, R. Herriot, W. Katke, M. Kupping & A. Towster. (1968). "The Autoling System". Univeristy of Wisconsin Tech Report #43, Sep. 1968.
Klein, S., M. Kuppins and K. Meives. (1969). "Monte Carlo Simulation of Language Change in Tikopia and Maori". University of Wisconsin Tech Report #62. Jun. 1969.

Klein, S. and Michael Kuppin (1970). "An Interactive, Heuristic Program for Learning Transformational Grammars". Univeristy of Wisconsin Tech Report #97. Aug. 1970.
Klein, S., Oakley J., Surballe D. and Robert Ziesmer (1971). "A Program for Generating Reports on the Status and History of Stochastically Modifiable Semantic Models of Arbitrary Universes". University of Wisconsin Tech Report #142. Nov. 1971.
Klein, S. and T. Dennison. (1971). "An Interactive Program for Learning the Morphology of Natural Languages". University of Wisconsin Tech Report #144. Dec. 1971.
Klein, S. (1973). "Automatic Inference of Semantic Deep Structure Rules in Generative Semantic Grammars." University of Wisconsin Tech Report #180. May 1973.
Klein, S., J. Aeschlimann, D. Balsiger, S. Converse, C. Court, M. Foster, R. Lao, J. Oakley and J. Smith. (1973). "Automatic Novel Writing: A Status Report" University of Wisconsin Technical Report #186. Dec. 1973.
Klein, S and V. Rozencevj (1974). "A Computer Model for the Ontogeny of Pidgin and Creole Languages". University of Wisconsin Tech Report #238. Dec. 1974.
Klein, S. (1974). "Computer Simulation of Language Contact Models". Toward Tomorrow's Linguistics. Edited by R. Shuy & C. J. Bailey. Georgetown University Press, 1974. pp. 276-290.
Klein, S. (1975). "Meta-Compiling Text Grammars as a Model for Human Behavior". University of Wisconsin Tech Report #252. Apr. 1975.
Klein, S., John Aeschlimann, Matthew Appelbaum, David Balsiger, Elizabeth Curtis, Mark Foster, David Kalish, Ying-Da Lee and Lynee Price.,(1976). "Forward: The History of Messy". University of Wisconsin Technical Report #272.
Klein, S., D. Kaufer and Christine Neuwirth. (1979). "The Locus of Metaphor in Frame Driven Text Grammar". University of Wisconsin Tech Report #366. Sep. 1979.
Klein, S.. (1981). "Culture, Mysticism and Social Structure and the Calculation of Behavior". University of Wisconsin Technical Report #462.
Klein, S. (1983). "Analogy, Mysticism and the Structure of Culture". Current Anthropology. vol. 24 N. 2. Apr. 1983.
Klein, S. (1985). "The Invention of Computationally Plausible Knowledge Systems in the Upper Paleolithic". University of Wisconsin Tech Report #628. Dec. 1985.
Klein, S. (2002). "The Analogical Foundations of Creativity in Language, Culture & the Arts: the Upper Paleolithic to 2100 CE". Language, Vision & Music, edited by Paul McKevitt, Mulvihill & Nuallin. John Benjamin, pp. 347-371.
Lukasiewicz, J. (1955). Aristotle's Syllogistic From the Standpoint of Modem Formal Logic. 2nd edition. Oxford.
Siemens, D. (1988). "On Klein's 'Analogy, Mysticism and the Structure of Cultre'". Current Anthropology, vol. 29 No. 3, Jun. 1988.
Steedman, M.,(1992). "Categorial Grammar". University of Pennsylvania Department of Computer and Information Science Technical Report No. MS-CIS-92-52.
Troelstra, A.S., (1999)."From Constructivism to Computer Science". Theoretical Computer Science, No. 211, 1999 p. 233-252.
Turing, Alan, (1947). "Lecture to the London Mathematical Society on Feb. 20, 1947". Unpublished Manuscript. In Alan Turing: His work and Impact. Edited by S. Cooper and Jan Leeuwen. 2012.
Turing, Alan, (1954). "Solvable and Unsolvable Problems". Science News, No. 31, p. 7-23.
Yngve , V.,(1996). From Grammar to Science: New Foundations for General Linguistics. Amsterdam.
Belnap, N., Leblanc H. & R. Thomason. "On Not Strengthening Intuitionistic Logic". Notre Dame Journal of Formal Logic vol. 4 No. 4, Oct. 1963.
Chretien, D. (1965). "Review of the Calculus of Linguistic Observations". Language vol. 4 No. 2, 1965.
Midmore, R,. (2014). "An Interpretation of Sheldon Klein's Four Valued Analogical Transformationl Operator". University of Wisconsin Technical Report #1801. Feb. 2014.
Norvig, P. and Stuart Russell. (2003). Artificial Intelligence: A Modern Approach. Pearson Education Inc. New Jersey, 2003.

(56) References Cited

OTHER PUBLICATIONS

Shapiro, S. and Robert Bechtel. (1976). "A Logic for Semantic Networks". University of Indiana Technical Report #47. Mar. 1976.
Sheldon Klein, John D. Oakley, David J. Suurballe and Robert A. Ziesemer. "A Program for Generating Report on the Status and History of Stochastically Modifiable Semantic Models of Arbitrary Universes", Technical Report #142, Nov. 1971.
Kleins, S., Aeschilmann, J.F., Balsiger, D.F., Converse, S.L., Court, C., Foster, M., Lao, R., Oakley, J.D., Smith, J. "Automatic Novel Writing: A Status Report", Technical Report #186, Jul. 1973.
Meta-Symbolic Simulation System (Messy) User Manual by Matthew A. Appelbaum with Forward: The History of Messy by Sheldon Klein, Computer Sciences Technical Report #272, Apr. 26, 1976.
Klein, S., Aeschlimann, J.F. , Appelbaum, M.A., Balsiger, D.F., Curtis, E.J., Foster, M., Kalish, S. D., Lee, Ying-Da, Price, L.A. "Simulation D'Hypotheses Emises Par Propp et Levi-Strauss en Utilisant un Systeme de Simulation Meta-Symbolique", Informatique et Sciences Humaines, No. 28, Mar. 1976, pp. 66-133.
Klein, S., "The Analogical Foundations of Creativity in Language, Culture & the Arts: the Upper Palcolithic to 2100CE" Language, Vision & Music Aug. 9-11, 1999, edited by Paul McKevitt et al., pp. 20-32.
Klein, S., Aeschlimann, J. F., Appelbaum, M.A., Balsiger, D.F., Curtis, E.J., Foster, M., Kalish, S.D., Lee, Ying-Da, Price, L.A. "Simulation D'Hypotheses Emises Par Propp et Levi-Strauss en Utilisant un Systeme de Simulation Meta-Symbolique", Informatique et Sciences Humaines, No. 28, Mar. 1976, pp. 66-133.

* cited by examiner

Fig. 1

| ¬ | |
|---|---|
| F | T |
| T | F |
| U | D |
| D | U |

(Negation)

| ∧ | F | T | U | D |
|---|---|---|---|---|
| F | F | F | F | F |
| T | F | T | U | D |
| U | F | U | U | F |
| D | F | D | F | D |

(Conjunction)

| ∨ | F | T | U | D |
|---|---|---|---|---|
| F | F | T | U | D |
| T | T | T | T | T |
| U | U | T | U | T |
| D | D | T | T | D |

(Disjunction)

Logical Connectives

Fig 2.

Diagram of a Grammar Phrase Structure Implementation

S[four-valued logical conditional test] → Np[] Vp[]

Np[*] → det[]  Pp[]

Np[*] → Np[]  Pp[]

Np[*] → N[]

Vp[*] → Vp[]  Np[]

Vp[*] → Vp[]  Pp[]

Vp[*] → V[]

Pp[*] → prep[]  Np[]

" I SAW THE MAN WITH THE TELESCOPE."

Fig. 3  Semantic Network

Fig. 4

Diagram of the arrays (with size = N)
associated with each Semantic Node

Fig. 5

METHODS AND SYSTEMS OF FOUR-VALUED SIMULATION

COPYRIGHT AND TRADEMARK NOTICE

This application includes material which is subject or may be subject to copyright and/or trademark protection. The copyright and trademark owner(s) has no objection to the facsimile reproduction by any of the patent disclosure, as it appears in the Patent and Trademark Office files or records, but otherwise reserves all copyright and trademark rights whatsoever.

BACKGROUND OF THE INVENTION (1) Field of the Invention

The invention generally relates to the storing information and testing of conditionals in computer implemented systems. More particularly, disclosed embodiments relate to four valued logic systems for general use in query and inference engines.

(2) Description of the Related Art

In the related art, various other logic systems or truth tables have been disclosed. But, the prior art lacks the efficiency of the presently disclosed embodiments.

BRIEF SUMMARY OF THE INVENTION

The present invention overcomes shortfalls in the related art by presenting an unobvious and unique combinations, configurations and use of methods, systems and means reducing the time and computational costs traditionally associated with testing, manipulation and analysis of data in computer architectures.

Disclosed embodiments overcome the shortfalls in the related art by presenting a notation that allows for the encoding of both syntactic and semantic information into a two bit vector notation within associated with a semantic node in a semantic network. Disclosed embodiments also overcome shortfalls in the art by encoding the property each feature assumes in recursive predicate analysis.

BRIEF DESCRIPTION OF THE DRAWINGS

FIG. 5 depicts a machine implementation These and other aspects of the present invention will become apparent upon reading the following detailed description in conjunction with the associated drawings.

DETAILED DESCRIPTION OF EMBODIMENTS OF THE INVENTION

The following detailed description is directed to certain specific embodiments of the invention. However, the invention can be embodied in a multitude of different ways as defined and covered by the claims and their equivalents. In this description, reference is made to the drawings wherein like parts are designated with like numerals throughout.

Unless otherwise noted in this specification or in the claims, all of the terms used in the specification and the claims will have the meanings normally ascribed to these terms by workers in the art.

Unless the context clearly requires otherwise, throughout the description and the claims, the words "comprise," "comprising" and the like are to be construed in an inclusive sense as opposed to an exclusive or exhaustive sense; that is to say, in a sense of "including, but not limited to." Words using the singular or plural number also include the plural or singular number, respectively. Additionally, the words "herein," "above," "below," and words of similar import, when used in this application, shall refer to this application as a whole and not to any particular portions of this application.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not only the systems described herein. The various embodiments described herein can be combined to provide further embodiments. These and other changes can be made to the invention in light of the detailed description.

Under the heading References is the academic literature specifically referenced in the application and is essential to the underlying invention.

Under the heading Further Reading is the academic literature relating to other academic work on this area of logic, added to assist patent searches and validate the mathematical claims of novelty. It is the mathematical properties of the four valued logics that have to be to correctly represent in implementations of the semantic network described Prof. by Sheldon Klein.

REFERENCES

Englemore, R. and Tony Morgan, (1988). *Blackboard Systems*. New York. Addisson Wesley Publishers.

Kleene, S., (1951) "Representation Of Events In Nerve Nets And Finite Automata". Rand Memorandum RM-704. December.

Kleene, S., (1952). *Introduction to Metamathematics*. North Holland.

Kleene, S. and Richard Vesley, (1965). *The Foundations Of Intuitionistic Mathematics Especially In Relation To Recursive Functions*. North-Holland.

Kleene, S., (1967). *Mathematical Logic*. John Wiley. New York.

Kleene, S., (1973). "Realizability: A Retrospective Survey". *Cambridge Summer School in Mathematical Logic*. Edited by Mathias, R. and H. Rogers. p.95-112.

Kleene, S., (1981). "The Theory of Recursive Functions, Approaching Its Centennial". Bulletin of the American Mathematical Society. Vol. 5, Number 1, July 1981.

Klein, S., Stephen Lieman and Gary Lindstrom, (1966). "DISEMINER: A Distributional Semantics Inference Maker". Carnegie Mellon University Tech Report #1719.

Klein, S., John Aeschlimann, Matthew Appelbaum, David Balsiger, Elizabeth Curtis, Mark Foster, David Kalish, Ying-Da Lee and Lynee Price.,(1976). FORWARD: The History of MESSY. University of Wisconsin Technical Report #272.

Klein, S., John Aeschlimann, Matthew Appelbaum, David Balsiger, Elizabeth Curtis, Mark Foster, David Kalish, Ying-Da Lee and Lynee Price. (1976) "Simulation D'Hypotheses Emises Par Propp & Levi-Strauss en Utilisant un Systeme de Simulation Meta-Symbolique". Informatique et Sciences Humaines. N. 28 Mars.

Klein, S. (1981). "Culture, Mysticism and Social Structure and the Calculation of Behavior". University of Wisconsin Technical Report #462.

Klein, S. (1988). "Reply to S.D. Siemens' critique of S. Klein's 'Analogy and Mysticism and the Structure of Culture (Klein 1983)'. Current Anthropology 29. P. 478-483.

Klein, S. (2002). "The Analogical Foundations of Creativity in Language, Culture & the Arts: the Upper Paleolithic to 2100 CE". Language, Vision & Music, edited by Paul McKevitt, Mulvihill & Nuallin. John Benjamin, pp. 347-371.

Midmore, R. (2014). "An interpretation of Sheldon Klein's Four Valued Analogical Transformational Operator". University of Wisconsin Tech Report #1801.

Steedman, M.,(1992). "Categorial Grammar". University of Pennsylvania Department of Computer and Information Science Technical Report No. MS-CIS-92-52.

Yngve, V.,(1996). From Grammar to Science: New Foundations for General Linguistics. Amsterdam.

FURTHER READING

Brouwer, E., (1981). *Brouwer's Cambridge Lecture on Intuitionism*. Edited by D. van Dalen.

Dubarle, D., (1977). Logos et Formalisation Du Langage. Paris. Dubarle, D., (1989). "Essai sur la generalisation naturelle de la logique usuelle (premier memoire)" Mathematiques et sciences humaines, vol.107. p. 17-73.

Halton, J., (1968). "A Retrospective and Prospective Survey Of The Monte Carlo Method". University of Wisconin Computer Science Tech Report #13. Febuary 1968.

Herdan, G. (1966). *The Advanced Theory of Language as Choice or Chance*. Spring-Verlag.

Lukasiewicz, J. (1955). *Aristotle's Syllogistic From the Standpoint of Modern Formal Logic*. 2nd edition. Oxford.

Piaget, J., (1952). "Essai sur les transformations des operations logiques. Les 256 operations ternaires de la logique bivalente". Paris Piaget, J., (1953). *Logic and Psychology*. Manchester University Press.

Reichenbach, H., (1949). *The Theory of Probability*. Los Angeles. (Proofed by Stephen Kleene)

Troelstra, A.S., (1999)."From Constructivism to Computer Science". Theoretical Computer Science, num. 211, 1999 p. 233-252.

Turing, Alan, (1947). "Lecture To The London Mathematical Society on 20 Feb. 1947". Unpublished Manuscript. In Alan Turing: His work and Impact. Edited by S. Cooper and Jan Leeuwen. 2012.

Turing, Alan, (1954). "Solvable and Unsolvable Problems". Science News, no. 31, p. 7-23.

All the above references and U.S. patents and applications are incorporated herein by reference. Aspects of the invention can be modified, if necessary, to employ the systems, functions and concepts of the various patents and applications described above to provide yet further embodiments of the invention.

Figure 1:
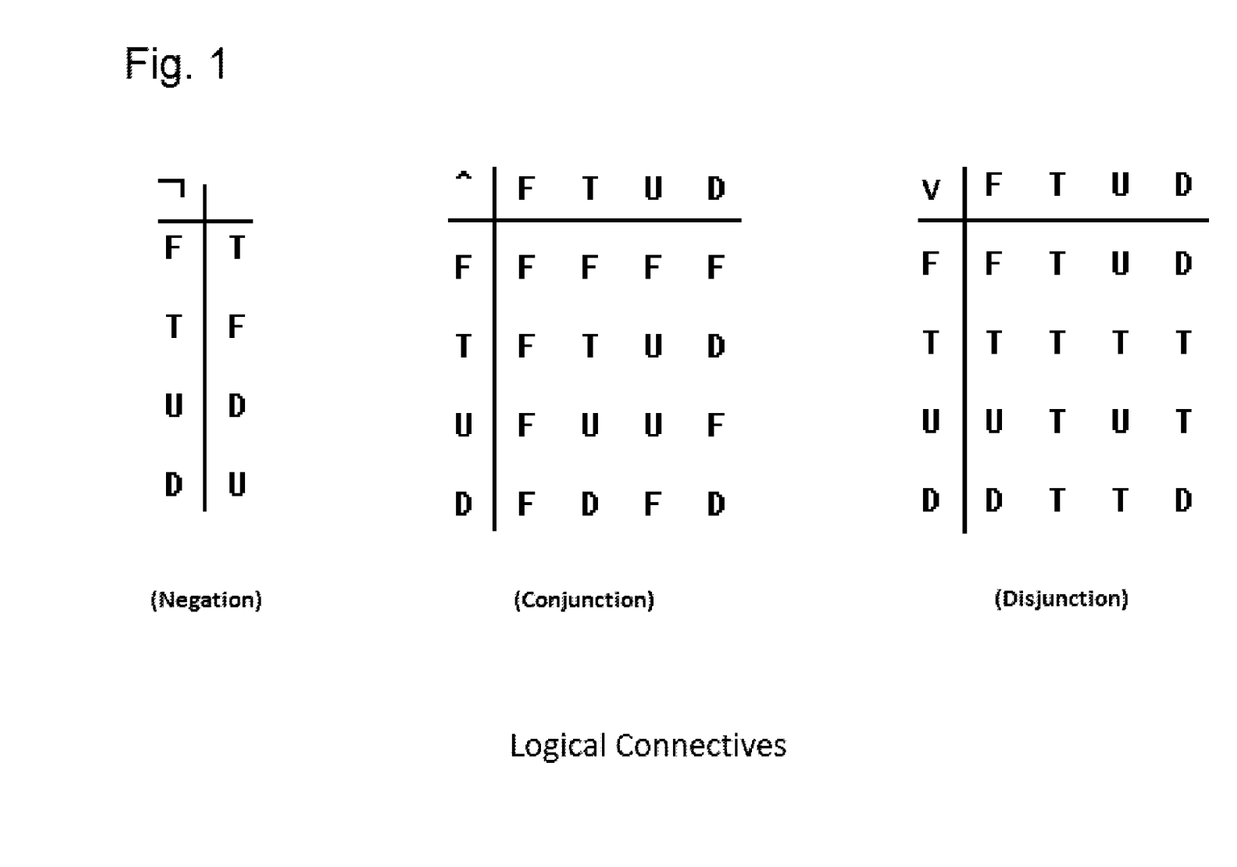
FIG. 1 depicts a disclosed logic

Referring to FIG. 1, a diagram for the basic binary operators and negation, ignoring monotonic arguments for negation, for a four valued logic is described. These operators are used in proving the completeness for a family of logics. These logics can be derived from a variety of different arguments. From considerations of Boolean groupings on the truth values, a pre-ordering of the truth tables into a lattice structure, or from set theoretic and recursive definitions. All are constructed to preserve some of the primary axioms in classical logic. By modeling the recursive values the truth values assume explicitly in the semantic network simplifies the testing of conditionals and the quantification of variables. The undefined value, the default value for growth to the system, allows for the dynamic benign encoding into the network, a logic property attributable to many Kleene logics. The fourth property allows for the proper quantification and binding of variables for the elimination of the effects of the newer truth values for subsequent steps in the calculation. It also provides the possibility for the introduction of an intuitionistic acceptable "terium non datur" for decision procedures for modeling Markov processes into the logic.

By encoding properties with a specific bit into the bit vector the linear scaling may be maintained. This system is a departure from prior art in complier design for creating symbol tables, testing of features and aids extended stack compiler implementations.

In first column of FIG. 1, the logical not sign is shown as ¬, in the second column of FIG. 1 the AND operator is shown as ^, in the third column of FIG. 1 the OR operator is shown as V. The first column shows the values before application of the not operator. For example, in the first row of the first column, the value of F is shown before application of the not operator and T is shown as a result.

In the second column, a OR operator takes one value from the first column and one value from the first row and shows the result of the logical operator where the column value and row value intersect. In the third column a AND operator is applied in a similar manner as in the second column. For example, in the third column, at the first row and selecting the last element, at the first column in selecting the second element D and F are shown and result in a value of D.

Figure 2:
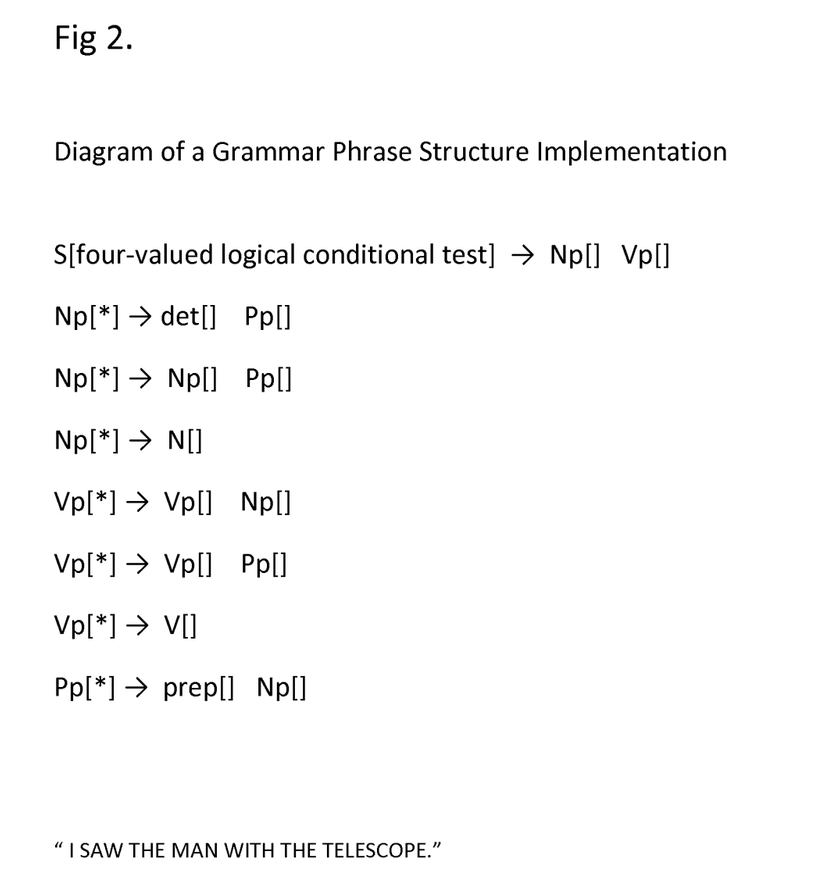
FIG. 2 depicts a grammar implementing a conditional test and quantification of variables for language generation

Referring to FIG. 2, a grammar for implementing a top/down derivation of the sentence "I saw the man with the telescope" with the conditional tests and quantification of variables for language generation being shown. The basic methodology used is push/pop where the conditional filters of a symbol popped or removed from a stack are used for testing phrasal rules for new constructions to be pushed upon the stack. These conditional tests are done in theoretic time O(C).

Figure 3:
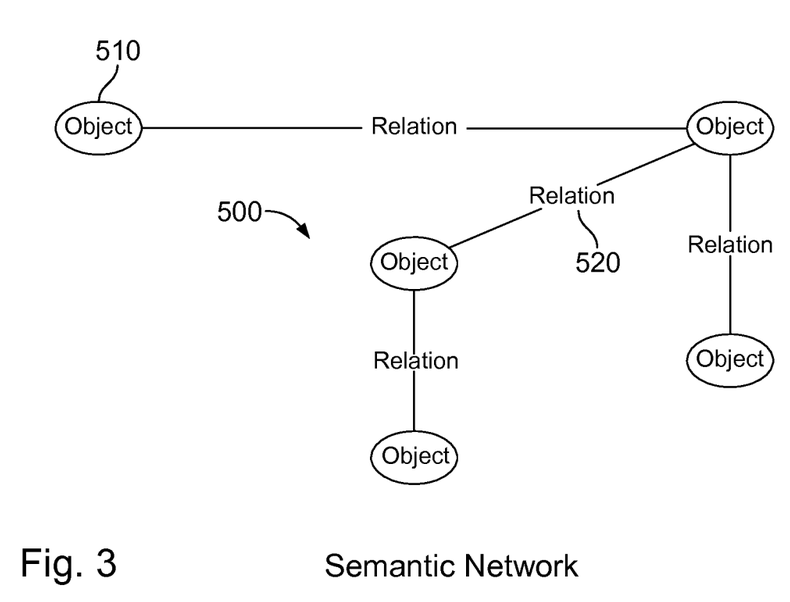
FIG. 3 depicts graphical representation of a semantic network

Referring to FIG. 3, a graphical representation of a semantic network 500 is shown with objects 510 and relations 520, with all objects and relations being nodes in memory or in a database.

Figure 4:
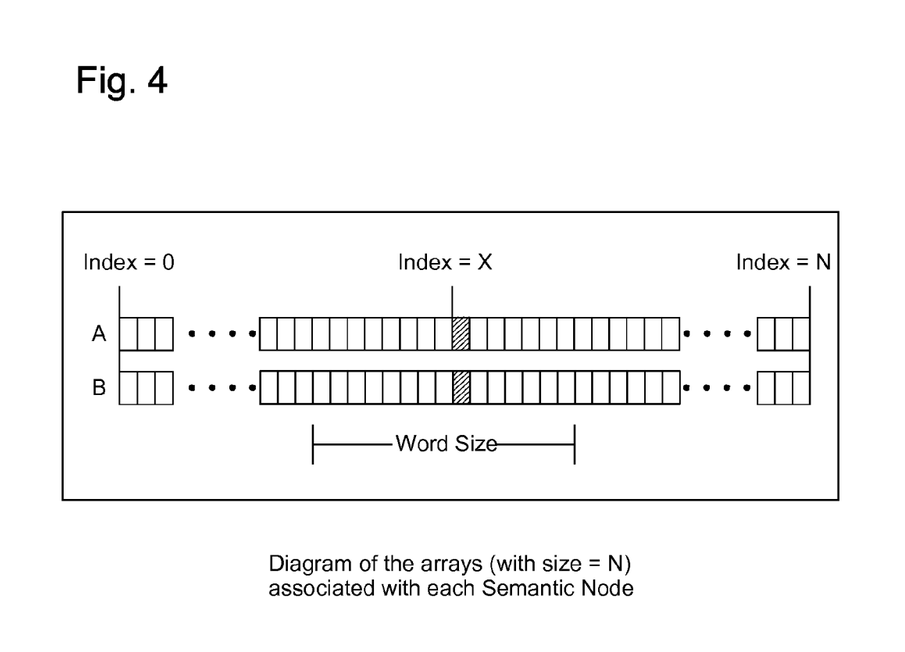
FIG. 4 depicts the assignment of a property to a particular index within array

FIG. 4 depicts a graphical representation of the two bit vector array associated with the semantic node in memory. FIG. 4 further shows the assignment of the truth value across the two arrays, with X being a specific index into the array. The word size in the figure is a consequence of word size limitations in computer architecture. This causes a chunking factor for implementations of the array.

Figure 5:
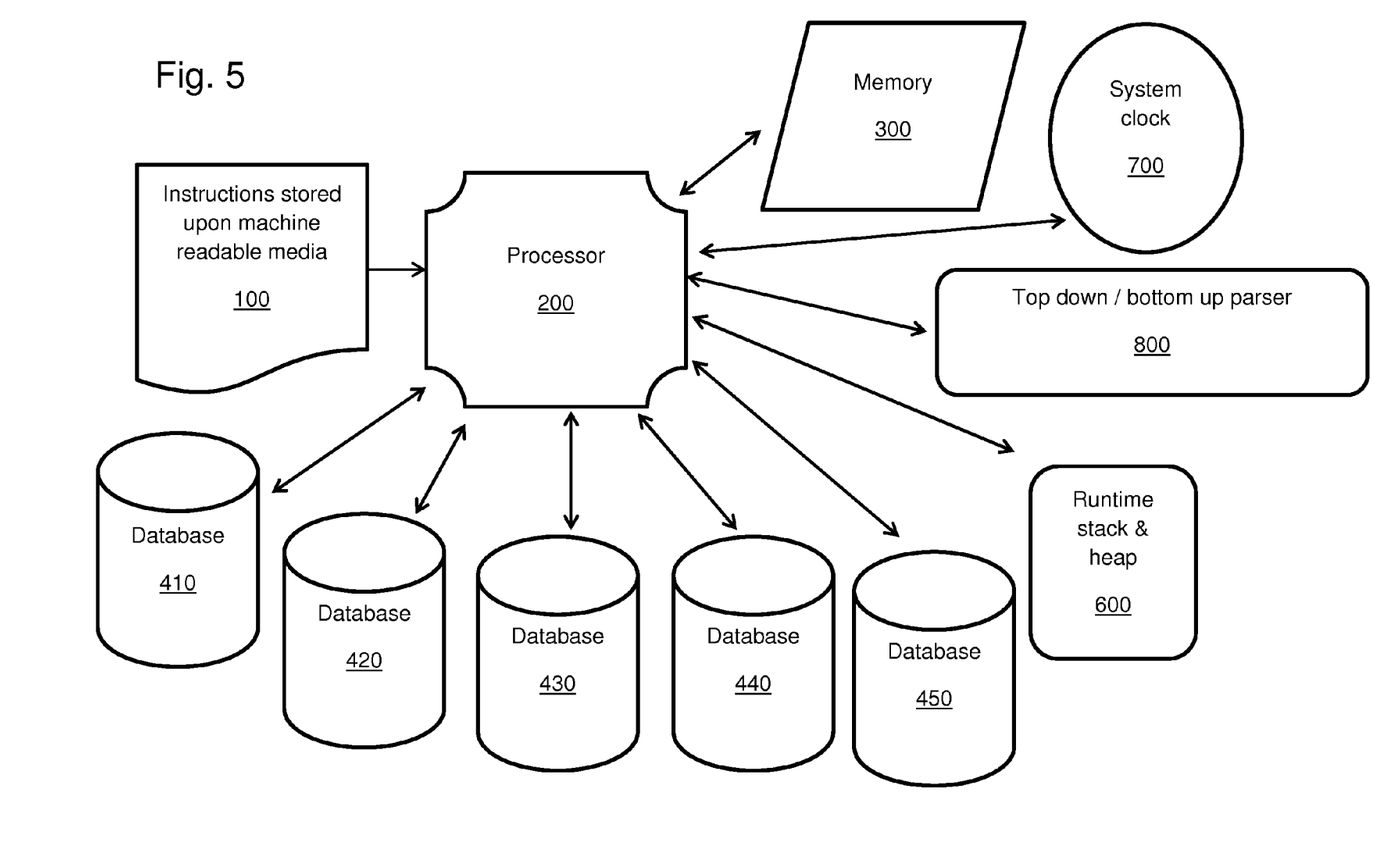

Referring to FIG. 5, a machine implementation is shown with a computer readable non-transitory media 100 having an instruction set or machine readable instructions sent to a general or specialized processor 200. The processor may be in communication with non-volatile memory 300 and a plurality of databases and other components, such as a network, user interfaces and other implements. The plurality of databases may include a database 410 of one or more semantic networks, such as the network system of FIG. 3, a database 420 of vector arrays the arrays may be associated with each semantic node or other network component, a database 430 of logical connectives, such as the connectives of FIG. 1, a database 440 of grammar phrase structure implementations, such as the implementation of FIG. 2, and a database of other disclosed components and systems. FIG. 5 also depicts a system clock 700, top down/bottom up parser 800 and runtime stack and heap 600.

These and other changes can be made to the invention in light of the above detailed description. In general, the terms used in the following claims, should not be construed to limit the invention to the specific embodiments disclosed in the specification, unless the above detailed description explicitly defines such terms. Accordingly, the actual scope of the invention encompasses the disclosed embodiments and all equivalent ways of practicing or implementing the invention under the claims.

While certain aspects of the invention are presented below in certain claim forms, the inventors contemplate the various aspects of the invention in any number of claim forms.

Disclosed embodiments include the following Items:

Item 1. A machine implemented method of executing a four-valued logic to optimize short term memory and to maximize long term storage, the method comprising:

a) using symbols comprising (F, T, U, D) to represent the values false, true, undefined, and defined, mapped into a two vector dynamic array; the values further mapped into indexes within the two vector dynamic arrays and stored as nodes within a semantic network;

b) for F, T, U, D, defined into set theory, such as { } for undefined, {T} for true, {F} for false, { } for undefined and {T, F} for defined, these values are interpreted as properties {P} for T and, {¬P} false, { } for undefined and {P, ¬P} for defined, which are the properties used for testing the conditionals and quantifying variables for successive recursive steps in the predicate calculus;

c) defining a logic with a negation, ignoring monotonic argumentations, with the following binary connectives: for the logical AND (^), NOT (¬); and logical OR (V) connectives as follows used to prove the completeness of the logics:

¬F is T
¬T is F
¬U is D
¬D is U;

d) for the ^ connective
^ F T U D
F F F F F
T F T U D
U F U U F
D F D F D;

e) for the V connective
V F T U D
F F T U D
T T T T T
U U T U T
D D T T D;

f) optimizing short term memory maximizing long term storage by the linear encoding of syntactic and semantic information into the semantic network;

g) in a parallel context optimizing short term memory to maximize long term storage becomes optimizing communication and memory between different knowledge sources (processes).

Item 2. The method of item 1 further comprising using the use of a phrase structure rewrite rule associated with a node within the semantic network for the testing and passing of the rewrite rule.

Item 3. The method of item 2 implementing a top/down, bottom/up parser capable of a plurality of syntactic parses of a grammar.

Item 4. The method of item 3 wherein the symbols comprise {S} for start, {N} for noun phrase, {Vp} for verb phrase and {Pp} for prepositional phrase (predicate participant) for natural language processing.

Item 5. The method of Item 4 wherein the terminal symbols comprise {N} for noun, {V} for verb, {det} for determinant and {prep} for preposition.

Item 6. The method of item 5 using a system clock, runtime stack and heap, a processor and a database of rewrite rules, a database of the semantic network and a database of syntactic and semantic information.

Item 7. A system for executing a four-valued logic to optimize short term memory and to maximize long term storage, the system comprising:

a) machine readable instructions stored upon a nonvolatile computer readable medium, a central processing unit, a runtime stack and heap, semantic network, top down/bottom up parser, a system clock;

b) the system using a Boolean encoding comprising (F, T, U, D) to represent the values false, true, undefined, and defined, mapped into a two vector dynamic array; the values further mapped into indexes within the two vector dynamic arrays and associated with nodes in a semantic network;

c) for {F, T, U, D} defined into set theory, such as { } for undefined, {T} for true, {F} for false, and {T,F} for defined, these values are interpreted as properties {P} for T, {¬P} for false, { } for undefined and {P, ¬P} for defined, which are the properties used for the testing of conditionals and quantifying of variables in the predicate calculus;

d) the system defining a logic with a negation with the following binary connectives: for the logical AND (^), NOT (¬); and logical OR (V) connectives as follows used to prove the completeness of the logics:

¬F is T
¬T is F
¬U is D
¬D is U;

e) for the ^ connective
^ F T U D
F F F F F
T F T U D
U F U U F
D F D F D;

f) for the V connective
V F T U D
F F T U D
T T T T T
U U T U T
D D T T D;

g) the system optimizing short term memory maximizing long term storage by the linear encoding of the information into the semantic network;

h) the system integrating memory in a parallel context to optimize communication and memory between different knowledge sources, (processes).

Item 8. The system of item 7 further comprising using the use of a phrase structure rewrite rule associated with a node within the semantic network for the testing and passing of the rewrite rule, the word size of the system imposing a chunking factor in the testing of conditionals in theoretic time O(C).

Item 9. The system of claim 7 implementing a top/down, bottom/up parser capable of a plurality of syntactic parses of a grammar.

Item 10. The system of claim 7 wherein the symbols comprise {S} for start, {N} for noun phrase, {Vp} for verb phrase and {Pp} for prepositional phrase for natural language processing.

Item 11. The system of item 7 wherein the terminal symbols comprise {N} for noun, {V} for verb, {det} for determinant and {prep} for preposition phrase of natural language processing.

Item 12. The system of item 7 further comprising a database of vector arrays, with each array associated with each semantic node, a database of the semantic network and a database of grammar phrase structure implementations and a database of logical connectives.

What is claimed is:

1. A machine implemented method of executing four-valued logic in a semantic network, the method comprising:
   defining a logic system having a NOT logical connective denoted as "⌐" an AND logical connective denoted as "∧" and an OR logical connective denoted as "∨" wherein false values are represented with an "F" symbol, true values are represented by a "T" symbol, undefined values are represented by a "U" symbol, and defined values are represented by a "D" symbol, such that for a property P false values are in a set {⌐ P}, true values are in a set {P}, undefined values are in a set { }, defined values are in a set {P, ⌐ P}, wherein said logic system is proven complete and w-consistent by a set of statements comprising:
   ⌐ F is T, ⌐ T is F, ⌐ U is D, ⌐ D is U;
   F∧F is F, F∧T is F, F∧U is F, F∧D is F;
   T∧F is F, T∧T is T, T∧U is U, T∧D is D;
   U∧F is F, U∧T is U, U∧U is U, U∧D is F;
   D∧F is F, D∧T is D, D∧U is F, D∧D is D;
   F∨F is F, F∨T is T, F∨U is U, F∨D is D;
   T∨F is T, T∨T is T, T∨U is T, T∨D is T;
   U∨F is U, U∨T is T, U∨U is U, U∨D is T; and
   D∨F is D, D∨T is T, D∨U is T, D∨D is D;
   generating a semantic network representing digitally stored information, said semantic network comprising a plurality of object nodes and a plurality of relationships between said plurality of object nodes, by:
     providing a first vector and a second vector in digital memory for each of said plurality of object nodes, each of said first vector and said second vector being a dynamically allocated array having a plurality of index positions each with a size of one bit;
     linearly encoding semantic information for an object node by storing two bits that together encode a false value, true value, undefined value, or defined value, a first bit of said two bits being stored at an index position within the first vector associated with the object node, and a second bit of said two bits being stored at the same index position within the second vector associated with the object node; linearly encoding syntactic information associated with said plurality of relationships in said digital memory; and
   testing conditionals or quantifying variables in said semantic network during successive recursive steps in a predicate calculus using said logic system, the false values, true values, undefined values, and defined values in the semantic information associated with said plurality of object nodes, and the syntactic information associated with said plurality of relationships,
   wherein linear encoding of said semantic information and said syntactic information optimizes short term memory, maximizes long term storage, and optimizes communication and memory between different knowledge sources or processes.

2. The method of claim 1, further comprising applying phrase structure rewrite rule on said plurality of object nodes in said semantic network.

3. The method of claim 2, further comprising implementing a top/down, bottom/up parser configured of a plurality of syntactic parses of a grammar.

4. The method of claim 3, wherein said top/down, bottom/up parser marks subsets of said plurality of object nodes as {S} for start, {Np} for a noun phrase, {Vp} for a verb phrase, or {Pp} for a prepositional phrase (predicate participant) during natural language processing.

5. The method of claim 4, wherein said top/down, bottom/up parser marks each of said plurality of object nodes as {N} for a noun, {V} for a verb, {det} for a determinant, or {prep} for a preposition.

6. The method of claim 5, wherein said top/down, bottom/up parser is coupled with a system clock, a runtime stack and heap, a processor, a database of rewrite rules, a database storing said semantic network, and a database storing said syntactic information and said semantic information.

7. A system for executing four-valued logic in a semantic network, the system comprising:
   a computing device comprising a central processing unit, a runtime stack and heap, a top down / bottom up parser, and a system clock;
   a logic system defined in memory of said computing device, said logic system having a NOT logical connective denoted as "⌐" an AND logical connective denoted as "∧" and an OR logical connective denoted as "∨," wherein false values are represented with an "F" symbol, true values are represented by a "T" symbol, undefined values are represented by a "U" symbol, and defined values are represented by a "D" symbol, such that for a property P false values are in a set {⌐ P}, true values are in a set {P}, undefined values are in a set { }, and defined values are in a set {P, ⌐ P}, wherein said logic system is proven complete and w-consistent by a set of statements comprising:
   ⌐ F is T, ⌐ T is F, ⌐ U is D, ⌐ D is U;
   F∧F is F, F∧T is F, F∧U is F, F∧D is F;
   T∧F is F, T∧T is T, T∧U is U, T∧D is D;
   U∧F is F, U∧T is U, U∧U is U, U∧D is F;
   D∧F is F, D∧T is D, D∧U is F, D∧D is D;
   F∨F is F, F∨T is T, F∨U is U, F∨D is D;
   T∨F is T, T∨T is T, T∨U is T, T∨D is T;
   U∨F is U, U∨T is T, U∨U is U, U∨D is T; and
   D∨F is D, D∨T is T, D∨U is T, D∨D is D;
   a non-transitory computer readable medium storing machine readable instructions for causing said computing device to perform the steps of generating a semantic network representing digitally stored information, said semantic network comprising a plurality of object nodes and a plurality of relationships between said plurality of object nodes, by:
     providing a first vector and a second vector in digital memory for each of said plurality of object nodes, each of said first vector and said second vector being a dynamically allocated array having a plurality of index positions each with a size of one bit;

linearly encoding semantic information for an object node by storing two bits that together encode a false value, true value, undefined value, or defined value, a first bit of said two bits being stored at an index position within the first vector associated with the object node, and a second bit of said two bits being stored at the same index position within the second vector associated with the object node; linearly encoding syntactic information associated with said plurality of relationships in said digital memory; and testing of conditionals or quantifying variables in said semantic network during successive recursive steps in a predicate calculus using said logic system, the false values, true values, undefined values, and defined values in the semantic information associated with said plurality of object nodes, and the syntactic information associated with said plurality of relationships, wherein linear encoding of said semantic information and said syntactic information optimizes short term memory, maximizes long term storage, and optimizes communication and memory between different knowledge sources or processes.

8. The system of claim 7, said machine readable instructions further comprising applying a phrase structure rewrite rule on said plurality of object nodes in said semantic network testing, wherein a word size of the system imposes a chunking factor during testing of conditionals in theoretic time O(C).

9. The system of claim 7, wherein said top down / bottom up parser is configured to perform a plurality of syntactic parses of a grammar.

10. The system of claim 7, wherein said top down / bottom up parser is configured to mark subsets of said plurality of object nodes as {S} for start, {Np} for a noun phrase, {Vp} for a verb phrase, or {Pp} for a prepositional phrase during natural language processing.

11. The system of claim 7, wherein said top down / bottom up parser is configured to mark each of said plurality of object nodes as {N} for a noun, {V} for a verb, {det} for a determinant, or {prep} for a preposition.

12. The system of claim 7, wherein said first vector and said second vector for each of said plurality of object nodes is stored in a database of vectors, said plurality of object nodes and said plurality of relationships is stored in a semantic network database, a plurality of grammar phrase structure implementations is stored in a grammar database, and logical connectives of said logic system are stored in a logical connectives database.

* * * * *